(12) United States Patent
Song et al.

(10) Patent No.: US 11,181,349 B1
(45) Date of Patent: Nov. 23, 2021

(54) ARROW SHAFT WITH HIGH STRENGTH

(71) Applicants: Yun Il Song, Busan (KR); Yun Sub Song, Busan (KR); Yun Jae Song, Busan (KR)

(72) Inventors: Yun Il Song, Busan (KR); Yun Sub Song, Busan (KR); Yun Jae Song, Busan (KR)

( * ) Notice: Subject to any disclaimer, the term of this patent is extended or adjusted under 35 U.S.C. 154(b) by 0 days.

(21) Appl. No.: 16/907,238

(22) Filed: Jun. 20, 2020

(51) Int. Cl.
  *F42B 6/04* (2006.01)
  *B32B 1/08* (2006.01)

(52) U.S. Cl.
  CPC .................. *F42B 6/04* (2013.01); *B32B 1/08* (2013.01); *B32B 2262/101* (2013.01); *B32B 2262/106* (2013.01); *B32B 2307/558* (2013.01)

(58) Field of Classification Search
  CPC ...................................... F42B 6/02; F42B 6/04
  See application file for complete search history.

(56) References Cited

U.S. PATENT DOCUMENTS

| | | | |
|---|---|---|---|
| 6,758,773 B1 | 7/2004 | Liao et al. | |
| 6,866,599 B2 * | 3/2005 | Eastman, II | F42B 6/04 428/36.91 |
| 7,201,818 B2 * | 4/2007 | Eastman, II | F42B 6/04 156/153 |
| 8,579,739 B2 * | 11/2013 | Song | F42B 6/04 473/578 |
| 9,194,671 B1 * | 11/2015 | Song | F42B 6/04 |
| 10,907,942 B2 * | 2/2021 | Greenwood | F42B 6/04 |
| 2003/0073524 A1 * | 4/2003 | Song | F42B 6/04 473/578 |
| 2006/0084534 A1 * | 4/2006 | Flowers | F42B 6/04 473/578 |
| 2017/0321999 A1 * | 11/2017 | Hoefer | F42B 6/04 |

FOREIGN PATENT DOCUMENTS

| | | |
|---|---|---|
| KR | 10-2002-0057554 A | 7/2002 |
| KR | 20-0351661 Y1 | 6/2004 |
| KR | 10-1063366 B1 | 9/2011 |

\* cited by examiner

*Primary Examiner* — John A Ricci (57) ABSTRACT

The present disclosure provides an arrow shaft with a high strength including, as the arrow shaft which has an arrowhead disposed at one side and an arrow nock disposed at the other side, at least one sheet layer which is laminated on and wound around at least a portion of an arrow shaft main body and is arranged in one direction, in which the sheet layer includes: a first sheet member which includes a plurality of sheet parts having at least some made of a transparent or translucent material and a second sheet member which has a strength reinforcing part formed on a portion where the first sheet member and at least a portion of the second sheet member overlap.

9 Claims, 5 Drawing Sheets

ARROW SHAFT WITH HIGH STRENGTH

BACKGROUND OF THE DISCLOSURE

Field of the Disclosure

The present disclosure relates to an arrow shaft with a high strength.

Description of Related Art

An arrow is generally composed of an arrow shaft of a hollow cylinder, an arrowhead which is mounted on the front end of the arrow shaft, an arrow nock which is mounted on the rear end of the arrow shaft, and a fletching which is attached to the rear outer circumferential surface of the arrow shaft.

When the arrow is repeatedly released several times, the influence of a paradox phenomenon on the arrow shaft is more severe than thought and the arrow shaft changes a direction around a pressure point (center of weight) several times during the flight and is bent like a bow, and when the arrow shaft continuously experiences such a phenomenon, deformation or breakage occurs in an intermediate portion of the arrow shaft where the center of gravity is located.

The archer's paradox phenomenon occurs the moment the arrow is released from the bow. At this time, when the strength, weight, length, and the like of the shaft are not suitable for the strength of the bow, the arrow does not fly straight.

Generally, a strong waist strength means that the strength of the arrow, that is, the waist force of the arrow is stronger than the strength of the bow and a weak waist strength means a weak strength of the arrow as compared to the strength of the bow.

Accordingly, to measure the strength of the shaft, a weight is attached to the center of the shaft and the amount of bending is measured, such that the shaft suitable for the strength of the bow is selected. The degree of the bending is called a spine.

When the spine of the arrow shaft is increased, there is an advantage in that there is less deformation of the material due to the straightness of the flight of the arrow or the frequent paradox phenomenon, but it is not necessarily advantageous to increase the spine of the arrow shaft unconditionally because the spine of the arrow shaft is required to be determined in consideration of the strength of the bow, and further, when the spine of the arrow shaft is increased, there is a problem in that the material cost and the production cost are increased.

Meanwhile, the arrow shaft experiences different external forces according to each location in a longitudinal direction thereof. That is, since the intermediate portion of the arrow shaft is subject to a frequent bending force due to the paradox phenomenon as described above, it is easy to become vulnerable due to long use, and the front portion of the arrow shaft to which the arrowhead is coupled is a portion which receives the most impact from the target upon shooting frequently. On the other hand, the rear portion of the arrow shaft to which the arrow nock is coupled is a portion which receives the most impact applied by the bowstring.

Accordingly, it is necessary to make the required elasticity, strength, or other physical properties different for each location of the arrow shaft in the longitudinal direction thereof. Accordingly, it is also necessary to perform the manufacturing of the arrow shaft so that the arrow shaft have different physical properties according to each location, but the conventional arrow shaft is formed only with a single sheet material, thereby not satisfying these desires.

RELATED ART DOCUMENT

Patent Document (Patent Document 1) Korean Patent Laid-Open Publication No. 10-2002-0057554 (2002.07.11)

SUMMARY OF THE DISCLOSURE

An object of the present disclosure is to provide an arrow shaft with a high strength, which may provide a high strength by forming a strength reinforcing part at an overlapping portion of a plurality of sheet layers which are wound around a cylindrical body of the arrow shaft and are laminated thereon.

The object of the present disclosure is not limited to the aforementioned object, and other objects not mentioned will be clearly understood by those skilled in the art from the following description.

For achieving the object, an arrow shaft with a high strength according to the present disclosure includes: as the arrow shaft which has an arrowhead disposed at one side and an arrow nock disposed at the other side, at least one sheet layer which is laminated on and wound around at least a portion of an arrow shaft main body and is arranged in one direction, in which the sheet layer may include: a first sheet member which includes a plurality of sheet parts, at least some of sheet parts being made of a transparent or translucent material; and a second sheet member which has a strength reinforcing part formed on a portion where the first sheet member and at least a portion of the second sheet member overlap.

In an exemplary embodiment of the present disclosure, the strength reinforcing part may be formed between the first sheet member and the second sheet member and between the sheet parts of the first sheet member.

In an exemplary embodiment of the present disclosure, the strength reinforcing part may have the first sheet member and the second sheet member which are sequentially laminated from the top toward the bottom.

In an exemplary embodiment of the present disclosure, the strength reinforcing part may be formed to have a size in a range of 5 to 20% relative to the entire area of the arrow shaft.

In an exemplary embodiment of the present disclosure, a width w of the strength reinforcing part may be formed in a range of 5 to 10 mm.

In an exemplary embodiment of the present disclosure, the strength reinforcing part is polished, and a horizontal cross section thereof may be formed in parallel in a longitudinal direction.

In an exemplary embodiment of the present disclosure, the polished strength reinforcing part may be processed so that the first sheet member and at least a portion of the second sheet member are retained.

In an exemplary embodiment of the present disclosure, the strength reinforcing part may be formed to have a vertical width $h_1$ of the first sheet member and a vertical width $h_2$ of the second sheet member at a size in a range of 1:2 to 3 with respect to a center axis of the arrow shaft main body.

In an exemplary embodiment of the present disclosure, the sheet layer may include at least one of a carbon fiber and a glass fiber.

Specific contents of other exemplary embodiments are included in the detailed description and the drawings.

According to the arrow shaft with the high strength according to the present disclosure, by forming the strength reinforcing part at the overlapping portion of the plurality of sheet layers which are wound around and laminated on the cylindrical body of the arrow shaft, it is possible to provide high strength.

The effect of the present disclosure is not limited to the aforementioned effect, and other effects not mentioned will be clearly understood by those skilled in the art from the description of the claims.

DESCRIPTION OF SPECIFIC EMBODIMENTS

Hereinafter, an exemplary embodiment of the present disclosure will be described in detail with reference to the accompanying drawings. It should be noted that in adding reference numerals to the components of each drawing, the same components have the same reference numerals even though they are displayed on different drawings. Further, in describing exemplary embodiments of the present disclosure, when it is determined that detailed descriptions of related well-known components or functions interfere with understanding the exemplary embodiments of the present disclosure, the detailed descriptions thereof will be omitted.

In describing the components of the exemplary embodiments of the present disclosure, terms such as first, second, A, B, (a), and (b) may be used. These terms are only for distinguishing the component from other components, and the nature, order, sequence, or the like of the component is not limited by the terms. Further, unless defined otherwise, all terms used herein, including technical or scientific terms, have the same meaning as commonly understood by those skilled in the art to which the present disclosure pertains. Terms such as those defined in a commonly used dictionary should be construed as having meanings consistent with meanings in the context of related technologies, and should not be construed as ideal or excessively formal meanings unless explicitly defined in the present application.

Hereinafter, an arrow shaft with a high strength according to an exemplary embodiment of the present disclosure will be described with reference to the drawings.

Figure 1:
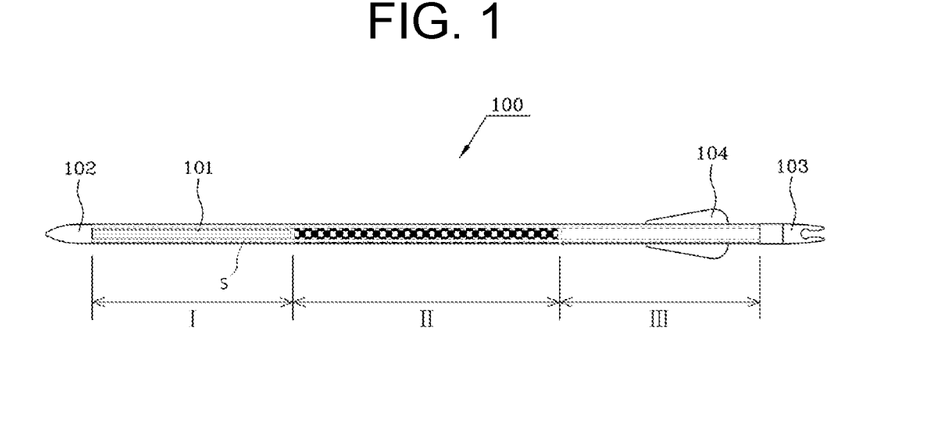
FIG. 1 is an exterior configuration diagram of an arrow according to a preferred exemplary embodiment of the present disclosure.

FIG. 1 is an exterior configuration diagram of an arrow according to a preferred exemplary embodiment of the present disclosure. An arrow 100 of the present disclosure is composed of a hollow tube-shaped arrow shaft 101, and as illustrated, the arrow shaft 101 is defined by being separately partitioned into three parts from the front end to which an arrowhead 102 is coupled to the rear end to which an arrow nock 103 is coupled. That is, the arrow shaft 101 is partitioned into a front part I, an intermediate part II, and a rear part III along the longitudinal direction thereof from the front end of the arrow shaft 101 to the rear end thereof. In the drawing, a reference numeral 104 not described denotes a fletching.

Figure 2:
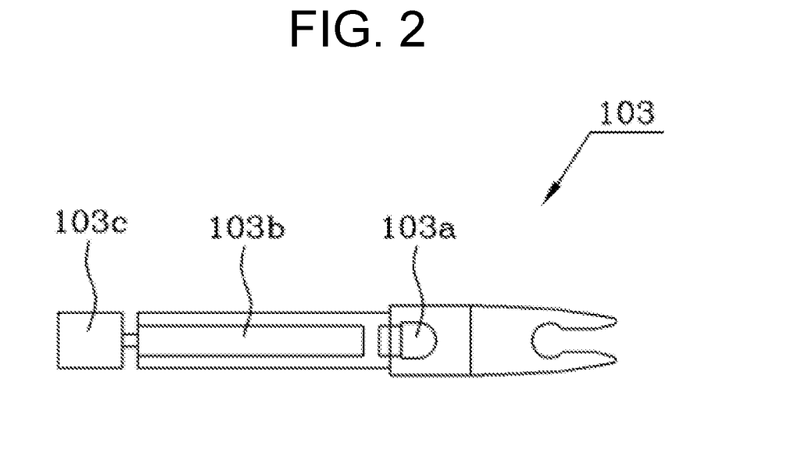
FIGS. 2 and 3 are cross-sectional diagrams of an arrow nock exemplarily illustrating a structure of a light emitting means which is mounted on an arrow shaft of the present disclosure.
Figure 3:
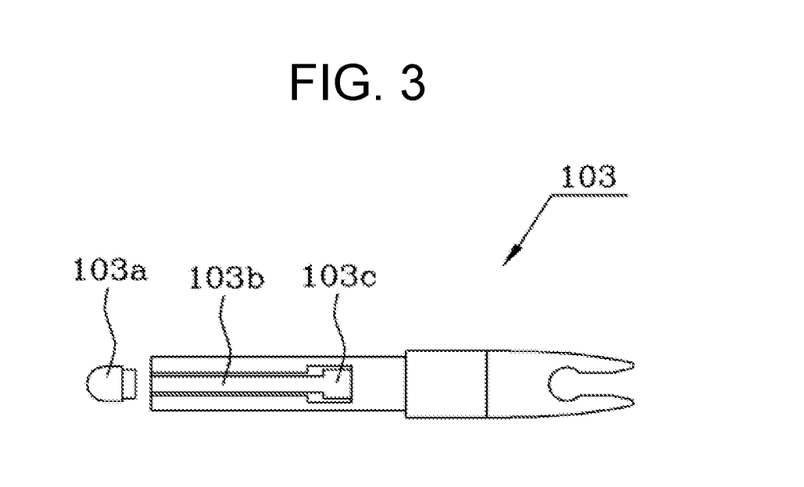

In the illustrated exemplary embodiment, the rear part III of the arrow shaft 101 is made of a transparent or translucent material and the arrow nock 103 is coupled to the rear end of the rear part III of the arrow shaft. FIGS. 2 and 3 are cross-sectional diagrams of an arrow nock exemplarily illustrating a structure of a light emitting means which is mounted on an arrow shaft of the present disclosure. The light emitting means illustrated in FIG. 2 has a structure generally employed conventionally, is mounted with a light source 103a such as an LED adjacently to a portion of the inside of the arrow nock to which a bowstring is fixed, and has a battery 103b mounted to be slidable in a longitudinal direction of the arrow nock inside the arrow nock 103. A switch 103c is formed to be connected to the battery 103b at the opposite side of the battery 103b coupled to the light source 103a.

The battery 103b is normally spaced so as not to be in contact with the light source 103a, and if the bowstring is fitted to the arrow nock 103, the switch 103c and the battery 103b slide to the right to be in contact with the light source 103a, and thus the light source 103a becomes an ON state electrically to light. In this case, the switch 103c is mounted to be fixed to the inner circumferential wall of the arrow shaft 101.

In the case of FIG. 3, the aforementioned light emitting structure is reversed. That is, the light source 103a is not mounted inside the arrow nock 103 but is located at the outside of the arrow nock 103 and is fixedly mounted on the inner circumferential wall of the arrow shaft 101. Further, the battery 103b and the switch 103c connected thereto are mounted to be slidable horizontally as illustrated inside the arrow nock 103.

In the case of such a structure, even if the bow is fitted to the arrow nock 103, the light source 103a is not lit, and the switch 103c and the battery 103b are slid forward of the arrow shaft 101 to be in contact with the light source 103a by inertia at the moment when the arrow is released to hit the target, and thus the light source 103a is electrically turned on to emit light.

In the present exemplary embodiment, since the rear part III of the arrow shaft 101 is made of a transparent or translucent material, the internal light is also irradiated to the outside through the arrow shaft 101, thereby improving visibility at a long distance at night.

In the above example, the structure of the light emitting means is merely an example for explaining the present disclosure and as the structure of the light emitting means to be applied to the present disclosure, any structure of the light emitting means conventionally known may be applied.

Figure 4:
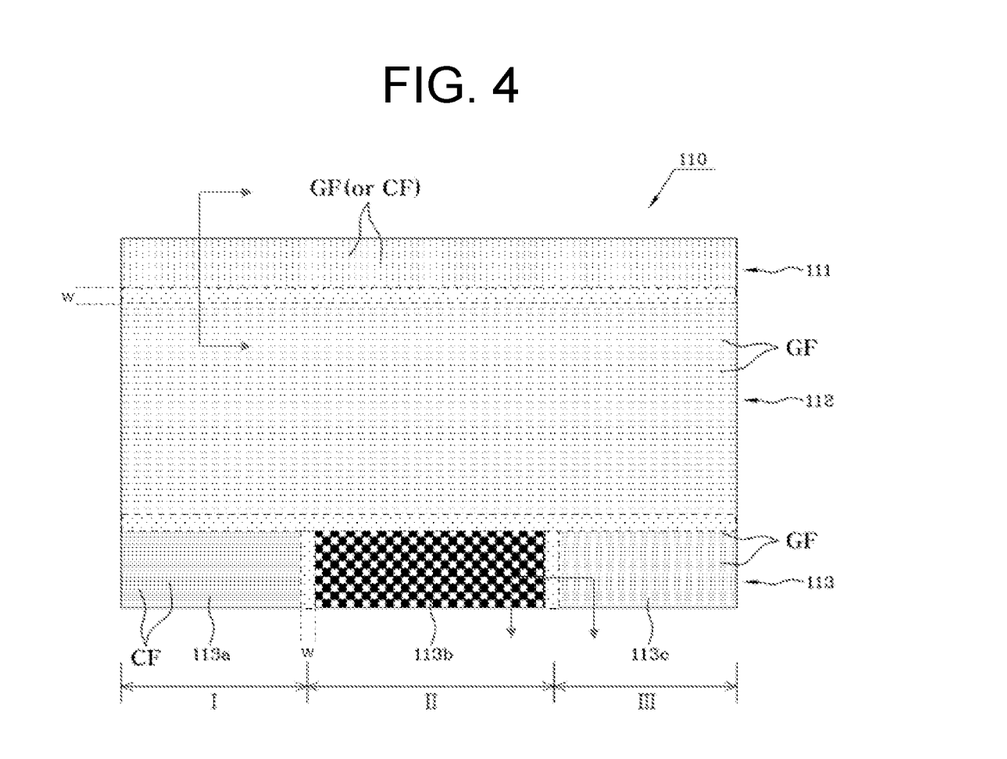
FIG. 4 is a developed diagram of an arrow shaft sheet according to an exemplary embodiment of the present disclosure.

FIG. 4 is a developed diagram of an arrow shaft forming sheet according to an exemplary embodiment of the present disclosure. The arrow shaft 100 is formed by using an arrow shaft forming sheet 110 as illustrated, and is produced through cutting→laminating and winding process→taping process→heat treatment/cooling process→demolding process→polishing process of the forming sheet 110.

The arrow shaft forming sheet 110 is made of an elastic sheet such as a carbon fiber sheet or a glass fiber sheet, or made by a combination of the elastic sheet and a non-elastic sheet such as a fiber sheet with a textile-printed or transfer-treated camouflage pattern.

The arrow shaft forming sheet 110 of the present embodiment is largely composed of a first sheet layer 111 as the lowermost layer, a second sheet layer 112 as the intermediate layer, and a third sheet layer 113 as the uppermost layer. The first sheet layer 111 is a layer in which a plurality of carbon fibers CF or a plurality of glass fibers GF are consecutively arranged side by side in one direction (a longitudinal direction in the drawing), and the second sheet layer 112 is a layer which a plurality of glass fibers GF are consecutively arranged side by side in the other direction (a transverse direction in the drawing).

A strength reinforcing part S in which the first sheet layer 111, the second sheet layer 112, and the third sheet layer 113 are overlapped with each other is formed at the connection portion of the first sheet layer 111, the second sheet layer 112 as the intermediate layer, and the third sheet layer 113 as the uppermost layer. Further, the strength reinforcing part S overlapped with each other is also formed at the connection portion of a front sheet 113a, an intermediate sheet 113b, and a rear sheet 113c of the third sheet layer 113.

The third sheet layer 113 is configured to have different materials according to the locations corresponding to the front part I, the intermediate part II, and the rear part III of the arrow shaft. The front sheet 113a which is a portion of the forming sheet 110 corresponding to the front part I is a sheet layer having the carbon fiber arrangement; the intermediate sheet 113b which is a portion of the forming sheet 110 corresponding to the intermediate part II is a carbon fabric sheet layer which is cross-woven so that the carbon fibers are orthogonal to each other; and the rear sheet 113c which is a portion of the forming sheet 110 corresponding to the rear part III is a sheet layer of a transparent or translucent material.

The rear sheet 113c of the transparent or translucent material is formed by impregnating the glass fiber with a transparent or translucent resin or prepreg-treating the glass fiber.

The front part I, the intermediate part II, and the rear part III of the arrow shaft according to the present exemplary embodiment are formed through the aforementioned processes after winding the aforementioned forming sheet 110 on a rod-shaped metal mandrel. The sheets 111, 112, 113 of each layer are formed by prepreg-treating a plurality of carbon fibers, glass fibers, or carbon fiber fabrics arranged side by side in one direction. That is, the sheets are manufactured by impregnating the carbon fibers with resins such as epoxy resin, polyester resin, and thermoplastic resin.

The first sheet layer 111, the second sheet layer 112, and the third sheet layer 113 are connected by the strength reinforcing part S, and the front sheet 113a, the intermediate sheet 113b, and rear sheet 113c of the third sheet layer 113 are also interconnected through the strength reinforcing part S. Accordingly, in the arrow shaft forming sheet 110 of the present disclosure, the first sheet layer 111, the second sheet layer 112, and the third sheet layer 113 form the strength reinforcing part S and are connected to each other to form one sheet.

As the material for manufacturing the arrow shaft 101, an elastic sheet such as a carbon fiber sheet or a glass fiber sheet, and a non-elastic sheet obtained by prepreg-treating natural fiber or synthetic fiber are used, and a carbon fiber sheet, which is a kind of the elastic sheet, is mainly used.

There are various types of the carbon fiber sheet and the glass fiber sheet depending on the use thereof and a tensile strength, a modulus of elasticity, an elongation, a weight, and a density are different depending on each type or model.

The tonnage of the carbon fiber or glass fiber prepreg sheet means the weight carried in the size of 1 mm in width and height, and for example, when the tonnage of the carbon fiber sheet is 24 tons, 24 tons represents 24 $TON/mm^2$. Accordingly, the higher tonnage of the carbon fiber sheet represents the high-elasticity sheet with higher strength. Accordingly, in the following description, the tonnage, spine, and elastic strength of the carbon fiber sheet are defined and used as the same concept.

There are various types of the prepreg-treated carbon fiber sheets and glass fiber sheets (hereinafter, simply referred to as the carbon fiber sheet or the glass fiber sheet), various models are produced from a sheet with general elasticity to a high-elasticity sheet with very strong elasticity, and a tensile strength, a modulus of elasticity, a tensile modulus, an elongation, and a mass and density per unit length are all different depending on each degree of elasticity.

Generally, when it is assumed that the thickness of the carbon fiber sheet or the glass fiber sheet is the same, as the number of carbon fibers or glass fibers arranged per unit area is be large or the weight thereof is larger, the elastic strength may be better.

Further, the carbon fiber fabric or the glass fiber fabric, which is woven by intersecting the carbon fibers or the glass fibers arranged in different directions, has advantages in that it has a superior elastic strength and is not broken well as compared to the sheet made of only the carbon fibers or the glass fibers arranged in one direction.

The first sheet layer 111 is the sheet layer of the lowermost layer which is attached in direct contact with the mandrel, and is formed of a relatively low-elasticity and low-strength carbon fiber sheet or glass fiber sheet. If the first sheet layer 111 is formed of the glass fiber sheet, the transparency of the arrow shaft 101 is improved.

The second sheet layer 112 is connected to the first sheet layer 111 so that the arrangements of the first sheet layer 111 and the glass fiber GF are orthogonal to each other. The third sheet layer 113 is partitioned into three parts along the longitudinal direction of the arrow shaft 101 and is formed of different carbon fiber sheets or glass fiber sheets for each part.

In the front part I of the arrow shaft 101, the sheet in which the carbon fiber CF is disposed denser than that of the second sheet layer 112 is selected as the front sheet 113a, and in the rear part III thereof, the transparent or translucent sheet obtained by prepreg-treating the glass fiber using the epoxy resins or the like is selected as the rear sheet 113c. At this time, the strength of the rear sheet 113c may be formed to be smaller or larger than that of the front sheet 113a by adjusting the compactness or the like of the glass fibers.

In the intermediate part II, the sheet having a higher elastic strength (spine strength) than that of the rear sheet 113c may be selected and applied as the intermediate sheet 113b. Accordingly, in the case of the third sheet layer 113, which is the outermost sheet layer among the sheet layers wound around the outer circumferential surface of the mandrel, the intermediate part II has a higher spine strength than those of the front part I and the rear part III. If the order of the spine strength of the arrow shaft 101 thus formed is listed as an example, the order of the intermediate part II, the rear part III, and the front part I may be made.

Of course, the strength order of the front part I, the intermediate part II, and the rear part III may be set differently as necessary.

In the present exemplary embodiment, for each length of the front part I, the intermediate part II, and the rear part III, when the total length of the arrow shaft 101 is 100, for example, the front part I may be 30% of the total length, the intermediate part II may be 40% of the total length, and the rear part III may be 30% of the total length. However, it is not necessary to manufacture the arrow shaft to be bound to such a rate and the rate thereof may be changed or adjusted without limit as necessary.

When the arrow shaft 101 is configured as described above, it is possible to reinforce the entire strength of the arrow shaft, thereby preventing damage and deformation of the arrow shaft due to the repeated impact and the paradox phenomenon, and deformation or damage of the front part I and the rear part III of the arrow shaft 101 due to the frequent shooting of the arrow.

Further, since the required elasticity or spine strength is differentiated and given for each location along the longitudinal direction of the arrow shaft 101, the flight stability or straightness of the arrow is improved.

A process of manufacturing the arrow shaft using the aforementioned arrow shaft forming sheet 110 will be described as follows.

First, a demolding body is applied to the entire outer circumferential surface of the mandrel (not illustrated) to facilitate demolding, and then an adhesive is applied thereon. The prepreg-treated arrow shaft forming sheet 110, which is appropriately cut to a predetermined length, is wound around and adhered to the outer circumferential surface of the mandrel. Specifically, the first sheet layer 111, which is the edge of the arrow shaft forming sheet 110, is adhered to the surface of the mandrel, and then the arrow shaft forming sheet 110 is laminated on and wound around the mandrel by a rolling apparatus (not illustrated). This is called a rolling process.

The film is wound around the outermost surface of the mandrel laminate after the rolling process is finished using a taping apparatus (not illustrated). This is called a taping process, and it is preferable to use a PET film or an OPP film as the film. This taping process is performed prior to forming a product which has undergone the rolling process, and is intended to discharge residual air between the respective sheet layers to the outside and increase the degree of internal lamination of the product.

Thereafter, the taped mandrel and sheet laminate are molded by varying the temperature step by step during a certain time, and then the mandrel is demolded. At this time, it is suitable that the preferred molding temperature is in a range of about 80 to 150° C., and a heating time is about 1 to 4 hours.

Finally, both ends of the demolded arrow shaft main body are cut to a required length, for example, about 825 mmm, and after the film is peeled, the outer circumferential surface of the arrow shaft main body is polished by a centerless polishing process. Here, when the polishing process is performed on the strength reinforcing part 200 of the arrow shaft main body, the arrow shaft 101 of the present exemplary embodiment with the high strength by the strength reinforcing part 200 in the longitudinal direction of the arrow shaft 101 is manufactured.

Figure 5:
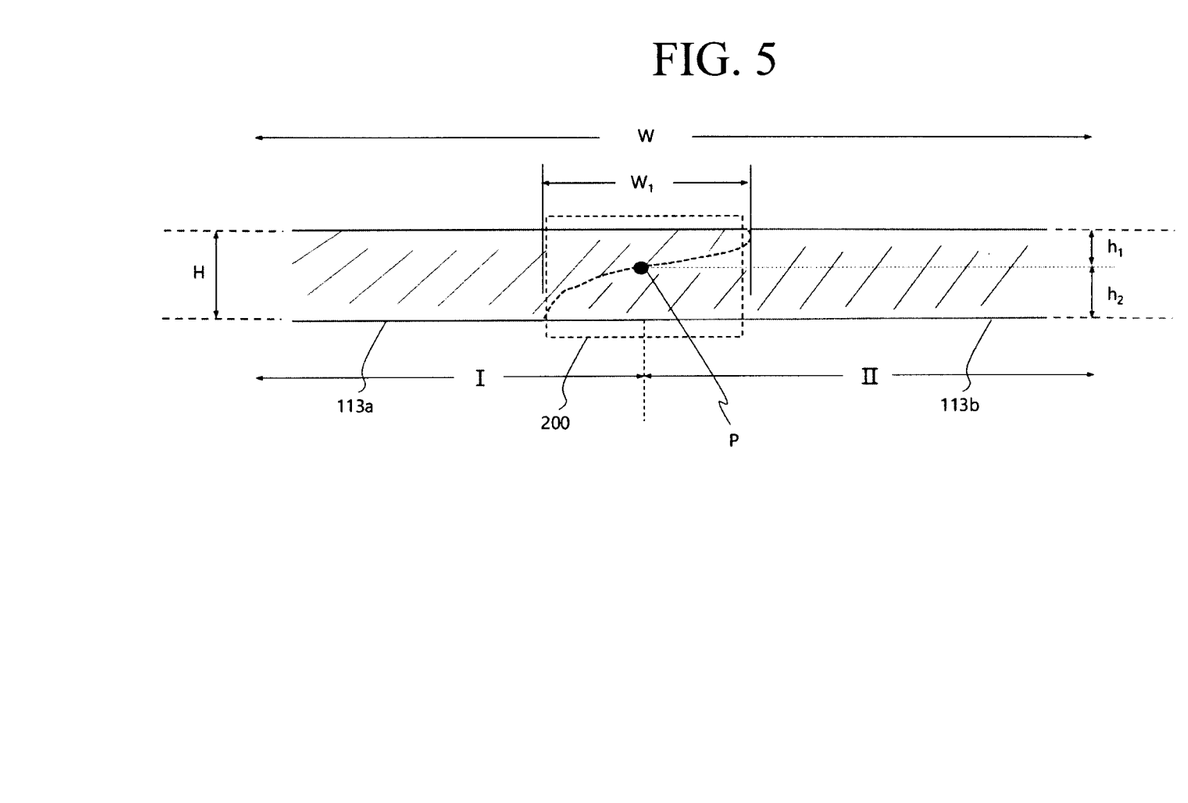
FIG. 5 is a cross-sectional diagram illustrating a portion taken along the line A-A illustrated in FIG. 4.

In this regard, FIG. 5 illustrates the strength reinforcing part 200 according to the present disclosure. Referring to FIG. 5, as described above, the third sheet layer 113 of the arrow shaft 101 according to the present disclosure may be composed of the front part I of the carbon fiber CF material, the intermediate part II with the highest spine strength, and the rear part III of a transparent or translucent sheet material obtained by prepreg-treating the glass fiber using an epoxy resin or the like. Here, the strength reinforcing part 200 may be formed between the front part I, the intermediate part II, and the rear part III.

Specifically, the strength reinforcing part 200 may be formed as a portion where the front part I and the intermediate part II overlap, and may be formed as a portion where the intermediate part II and the rear part III overlap. That is, the strength reinforcing part 200 may be formed by being polished after the front sheet 113a and the intermediate sheet 113b overlap, and formed by being polished after the intermediate sheet 113b and the rear sheet 113c overlap.

The strength reinforcing part 200 may be formed of the overlapping portion between the front part I and the intermediate part II and the portion where the intermediate part II and the rear part III overlap, and processed so that each sheet after being polished is retained. At this time, the strength reinforcing part 200 may be formed in a range of about 1 to 20% relative to the total area of the forming sheet 110 of the arrow shaft 101, and preferably formed to have a width $W_1$ in a range of about 5 to 10 mm. In this range, it is possible to improve the strength even without significantly increasing the weight of the arrow shaft 101.

Furthermore, the strength reinforcing part 200 may be formed to have a vertical width $h_1$ of the third sheet layer 113 and a vertical width $h_2$ of the third sheet layer 113 at the size in a range of 1:2 to 3 relative to a central axis P of the arrow shaft 101.

Figure 6:
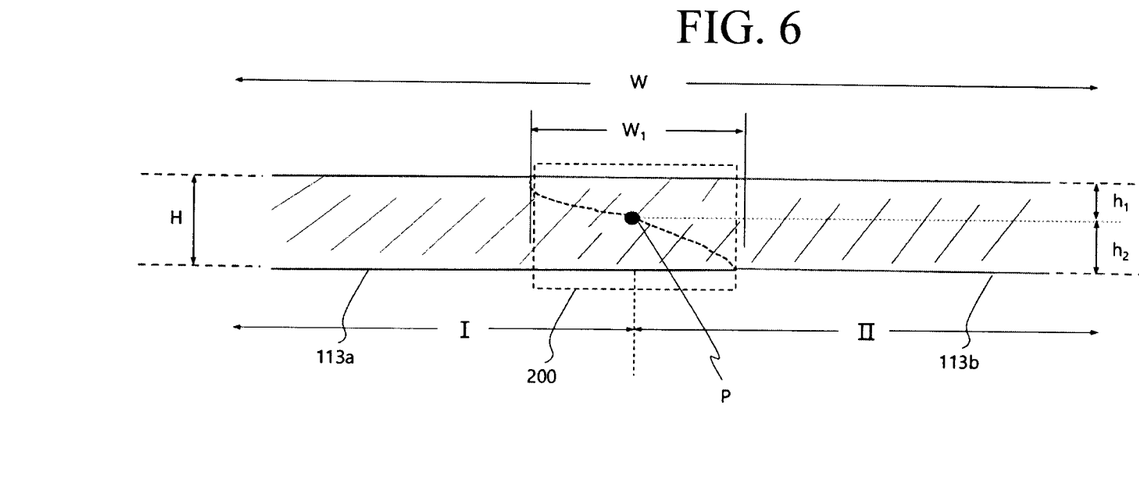
FIG. 6 is a cross-sectional diagram of an arrow shaft main body according to another exemplary embodiment of the present disclosure.

Here, according to the present disclosure, as illustrated in FIG. 5, the third sheet layer 113 may be composed of the front sheet 113a, the intermediate sheet 113b, and the rear sheet 113c, and the strength reinforcing part 200 may be formed in the form in which the front sheet 113a is laminated at the top of the intermediate sheet 113b. At this time, as described above, the vertical width $h_1$ of the front sheet 113a of the third sheet layer 113 may be formed to have the size in the range of 1:2 to 3 as compared to the vertical width $h_2$ of the intermediate sheet 113b. Alternatively, as illustrated in FIG. 6, the strength reinforcing part 200 may be formed in the form in which the intermediate sheet 113b of the third sheet layer 113 is laminated at the top of the front sheet 113a.

That is, the present disclosure may form the strength reinforcing part 200, thereby improving the strength of the arrow shaft 101 and at the same time, may variously configure the lamination form of the respective sheets to form the sheet layer including a specific material as the uppermost layer, thereby providing the desired strength and effects. For example, in order to form the wider rear part III of the third sheet layer 113 made of a transparent or translucent sheet material, the strength reinforcing part 200 may be formed so that the rear sheet 113c is formed at the top of the intermediate sheet 113b, thereby securing the wider transparent or translucent portion. In another example, in order to form the wider intermediate part II of the intermediate sheet 113b made of a material with the highest spine strength, the strength reinforcing part 200 may be formed so that the intermediate sheet 113b is formed at the tops of the front sheet 113a and the rear sheet 113c, thereby significantly reinforcing the strength of the intermediate part II.

Further, although not illustrated in the drawings of the present disclosure, it is natural that the strength reinforcing part 200 which is formed by overlapping the first sheet layer 111 and the second sheet layer 112 described above and the strength reinforcing part 200 which is formed between the second sheet layer 112 and the third sheet layer 113 may also be configured so as to be laminated in various shapes as necessary, as described above.

It may be understood that those skilled in the art to which the present disclosure pertains may carry out the present disclosure in other specific forms without changing the technical spirit or the essential features. Accordingly, it should be understood that the aforementioned exemplary embodiments are illustrative and not limitative in all respects. It should be understood that the scope of the present disclosure is defined by the following claims rather than the detailed description, and all changed or modified examples derived from the meaning and scope of the claims and the equivalent concept thereof are included in the scope of the present disclosure.

What is claimed is:

1. An arrow shaft with a high strength comprising:
   an arrow shaft which has an arrowhead disposed at one side and an arrow nock disposed at the other side,
   at least one sheet layer which is laminated on and wound around at least a portion of an arrow shaft main body and is arranged in one direction,
   wherein the sheet layer comprises:
   a first sheet member which comprises a plurality of sheet parts, at least some sheet parts being made of a transparent or translucent material; and
   a second sheet member which has a strength reinforcing part formed on a portion where the first sheet member and at least a portion of the second sheet member overlap.

2. The arrow shaft with the high strength of claim 1, wherein the strength reinforcing part is formed between the first sheet member and the second sheet member and between the sheet parts of the first sheet member.

3. The arrow shaft with the high strength of claim 1, wherein the strength reinforcing part has the first sheet member and the second sheet member which are sequentially laminated from the top toward the bottom.

4. The arrow shaft with the high strength of claim 1, wherein the strength reinforcing part is formed to have a size in a range of 5 to 20% relative to the entire area of the arrow shaft.

5. The arrow shaft with the high strength of claim 1, wherein a width w of the strength reinforcing part is formed in a range of 5 to 10 mm.

6. The arrow shaft with the high strength of claim 1, wherein the strength reinforcing part is polished, and a horizontal cross section thereof is formed in parallel in a longitudinal direction.

7. The arrow shaft with the high strength of claim 6, wherein the polished strength reinforcing part is processed so that the first sheet member and at least a portion of the second sheet member are retained.

8. The arrow shaft with the high strength of claim 7, wherein the strength reinforcing part is formed to have a vertical width $h_1$ of the first sheet member and a vertical width $h_2$ of the second sheet member at a size in a range of 1:2 to 3 with respect to a center axis of the arrow shaft main body.

9. The arrow shaft with the high strength of claim 1, wherein the sheet layer comprises at least one of a carbon fiber and a glass fiber.

\* \* \* \* \*